April 28, 1970　　D. S. HEIDTMANN　　3,509,394
ELECTROMAGNETIC CLUTCH CONTROL
Filed Jan. 11, 1967

INVENTOR.
DONALD S. HEIDTMANN
BY Radford M. Reams
HIS ATTORNEY

United States Patent Office 3,509,394
Patented Apr. 28, 1970

3,509,394
ELECTROMAGNETIC CLUTCH CONTROL
Donald S. Heidtmann, Louisville, Ky., assignor to General Electric Company, a corporation of New York
Filed Jan. 11, 1967, Ser. No. 608,559
Int. Cl. B65h 59/38
U.S. Cl. 310—95                                    6 Claims

ABSTRACT OF THE DISCLOSURE

An electromagnetic clutch output speed control wherein the clutch field coil is connected in an electric supply circuit with a controlled rectifier. A tachometer generates a voltage responsive to the output speed and control the conduction of a transistor, which in turn controls the firing of the control rectifier.

---

An object of this invention is to provide an improved, simple electromagnetic clutch control having a minimum number of active components.

Another object of this invention is to provide such a control which has a high gain, for good speed regulation with wide load variations.

A further object of this invention is to provide such a control which has a fast response, for good speed regulation with pulsating loads.

In carrying out my invention, in one form thereof, I provide a control for an electromagnetic clutch having a rotatable output member. A coil is included to vary the torque transmission capability of the clutch in response to the average current passing through the coil. A control circuit connects the coil to a source of pulsating electric energy in series with the anode to cathode path of a controlled rectified. The gate of the controlled rectifier is connected in the circuit, on the anode side of the controlled rectifier, through a limiting resistor. The gate also is connected in the circuit, on the cathode side of the controlled rectifier, through the collector-to-emitter path of a transistor. I further provide generating means for sensing a speed responsive to the speed of the output member of the clutch and producing a D.C. voltage representative thereof. I also include means connecting the base of the transistor to the generating means for applying a current to the base of the transistor responsive to the generated voltage so that the anode to cathode conductivity of the control rectifier is responsive to the conduction of the transistor and consequently to the output speed of the clutch.

The subject matter which I regard as my invention is particularly pointed out and distinctly claimed in the concluding portion of this specification. The invention itself, however, both as to its organization and method of operation may best be understood by reference to the following description taken in conjunction with the accompanying drawing.

Figure 1:
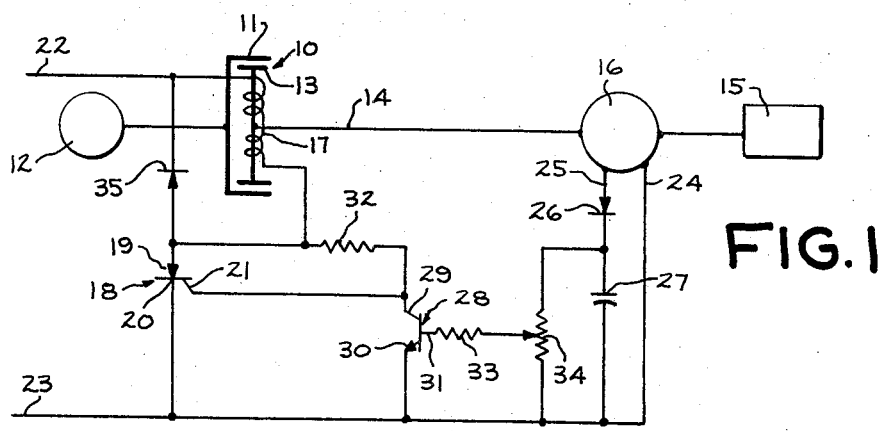
FIGURE 1 is a schematic diagram of one embodiment of the invention.

Referring now to FIGURE 1, there is shown in schematic form an electromagnetic coupling device such as an electromagnetic clutch 10. The clutch 10 includes a rotatable driving member 11, energized by a suitable motor 12, and a rotatable driven member 13, from which torque is transmitted through a shaft 14 to a suitable load device 15. A suitable tachometer type generator 16 also is driven by the shaft 14, thereby developing an electrical potential or voltage which is representative of the angular velocity of the shaft 14 and thus the driven member 13. Preferably, the generator 16 is of the A.C. permanent-magnet alternator type.

The clutch or coupling device 10 also includes a field coil 17 to vary the torque transmission capability or slippage of the clutch in response to the average current flow therethrough. By varying the current supplied to the coil, the speed at which motor 12 will drive any given load 15 may be controlled.

A controlled rectifier, preferably of the silicon-controlled type, is shown at 18 and includes an anode 19, a cathode 20, and a gate 21. A pair of conductors 22 and 23 are provided to connect the coil 17 to a suitable source of pulsating electrical energy (not shown), for instance the usual 110-120 volt A.C. domestic power, and the conductor 22 may be considered the power conductor and the conductor 23 the neutral conductor. One side of coil 17 is connected to conductor 22 while the other side is connected to conductor 23 in series with the anode 19 and cathode 20 of the controlled rectifier 18.

One terminal 24 of the tachometer generator 16 is connected the neutral conductor 23 while the other terminal 25 is connected through a rectifier 26 and a filter capacitor 27 to the neutral conductor 23. Thus, a filtered D.C. voltage, representative of the A.C. voltage generated by tachometer 16 will appear across the capacitor 27.

A transistor 28 is shown, including a collector 29, an emitter 30 and a base 31. The gate 21 is connected in the circuit on the anode side of the controlled rectifier 18, through a limiting or dropping resistance means such as resistor 32 and is connected in the circuit, on the cathode side of the controlled rectifier 18 (that is, to conductor 23), through the collector 29 and emitter 30 of the transistor 28. The base 31 of the transistor is connected through a dropping resistor 33 to a variable resistor 34 which, in turn, is connected between the conductor 23 and the junction between the rectifier 26 and filter capacitor 27. It is to be noted that transistor 28 is "unbiased" in that no battery or other energy source is provided to produce an initial bias across the transistor terminals.

Assuming, for purposes of describing the operation of the system, that the shaft 14 is at rest and the motor 12 is energized to drive the input or driving member 11, no voltage will be generated by the generator 16 so that no current will be provided to the transistor 28. When the polarity of the applied voltage is proper, so that conductor 22 is positive with respect to conductor 23, a current will flow through the field coil 17 and the dropping resistor 32 into the gate 21 of the control rectified 18. This current is sufficient that, for every half cycle of applied power of proper polarity, the controlled rectifier will turn on essentially at the beginning of the half cycle and will conduct for a full half cycle. This enables current flow from conductor 22 through coil 17 and anode 19 and cathode 20 of controlled rectifier 18 to conductor 23. With this condition, field coil 17 provides maximum clutching from input member 11 to driven or output member 13. The output member 13 and shaft 14 begin to accelerate toward the speed of the input member 11. The time required for this acceleration of the output member depends upon the size of the load device 15.

As the shaft 14 rotates, tachometer 16 generates an A.C. potential which is rectified by rectifier 26 and filtered by capacitor 27. A portion of this rectified voltage, depending upon the setting of variable resistor 34, causes a current flow through the dropping resistor 33 to the base to emitter circuit of the transistor 28. This current flow causes the transistor to turn on (conduct from the collector 29 to the emitter 30) and divert current from the gate of the controlled rectifier. The reduced current to the gate of the controlled rectifier causes the rectifier to turn on later in each half cycle of proper polarity.

The transistor is turned on more and more as the tachometer potential increases until a point is reached where there is not sufficient gate current into the controlled rectifier, even at the peak of the applied voltage, and the SCR does not turn on at all. Then current will essentially cease to flow through the field coil 17 and the torque transmission capability of the clutch falls, so that the speed of the output member decreases.

In this manner a balanced condition is reached wherein the controlled rectifier is caused to conduct a sufficient portion of the time for the output of the clutch to rotate at a predetermined speed. The speed at which the control circuit reaches this equilibrium condition depends upon the setting of variable resistor 34. The resistance acts as a voltage divider and, by changing the setting of the resistance, the current flowing into the base 31 of transistor 28 may be varied for any predetermined angular velocity of the clutch output member 13.

Since the controlled rectifier 18 will conduct in one direction only, energization of the clutch from an A.C. type pulsating source will cause the clutch coil always to be de-energized during one-half of each cycle of applied power across conductors 22 and 23. In order to prevent erratic operation of the clutch, because of this half wave power, a diode 35 is connected across the coil 17 to act as a free wheeling diode and allow effective clutch operation from a half wave supply.

This circuit has a very high gain which is necessary for good speed regulation. That is, the high gain of the control circuit enables the circuit to effectively control the coil 17 to maintain the predetermined speed over a very wide variation in load size. The circuit also has a very fast response which enables the circuit to give good speed relation with a pulsating load or changing load. At the same time, the circuit is simple and low cost, having only two active elements, that is, the transistor 28 and the controlled rectifier 18.

For an electromagnetic clutch to be included in a domestic washing machine, for instance, I have found the following values of components to perform satisfactorily:

18—General Electric silicon controlled rectifier C106B
26—General Electric rectifier 1N34
27—5 microfarads
28—General Electric transistor 2N2714
32—100,000 ohms
33—10,000 ohms
34—10,000 ohms maximum (adjustable)
35—General Electric rectifier A13B The basic circuit of FIGURE 1 provides phase control up to the peak point of each half cycle of proper polarity and on-off control beyond the peak point. That is, the circuit will control the turn on or firing of the controlled rectifier up to the point at which the proper half cycle of applied voltage is at a peak (90° for a sine wave) thereafter, the control will be either on or off for the remainder of the half cycle, depending upon whether the controlled rectifier has begun to conduct before the peak.

Figure 2:
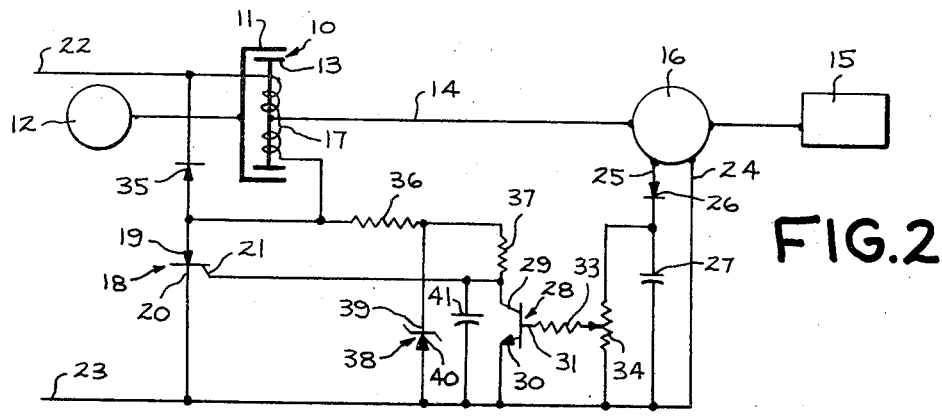
FIGURE 2 is a schematic diagram of another embodiment of the invention.

For some applications, it may be desirable to provide full phase control over each half cycle of proper polarity. For instance, where the load is relatively small, the speed of the output member will tend to oscillate around the desired speed. If the coil is pulsed with signals of one quarter cycle or more, as is true with the circuit of FIGURE 1, the changes in torque transmission capability of the clutch may cause the amplitude of these oscillations to be rather large. If the instantaneous output speed control for a relatively small load must be held to very close tolerances, the circuit of FIGURE 1 may not provide completely satisfactory control. FIGURE 2 is a schematic illustration of the control circuit of FIGURE 1 modified so as to provide full phase control for such close tolerance applications.

Referring now to FIGURE 2, the circuit is basically the same as that in FIGURE 1. Therefore like components will be identified with like reference numerals. It will be seen that the gate 21 of the controlled rectifier is connected in the circuit, on the anode side of the controlled rectifier through a pair of serially-connected limiting or dropping resistance means such as resistors 36 and 37, rather than through the single dropping resistor 32 of FIGURE 1. A Zener diode 38 is provided with its cathode 39 connected to the junction between resistors 36 and 37 and its anode 40 connected to neutral conductor 23. A capacitor 41 is connected on one side to the gate 21 of the controlled rectifier 18 and on its other side to neutral conductor 23 (which effectively places this latter connection at the junction of the cathode 20 of the controlled rectifier 18 and the emitter 30 of the transistor 28).

With the circuit modified as described, the dropping resistor 36 and Zener diode 38 provide a voltage plateau from which the capacitor 41 is charged through the resistor 37. The level of the plateau is set so as to be high enough to charge the capacitor to a value necessary to provide a current sufficient to turn on the controlled rectifier 18. The time required to charge the capacitor 41 to a voltage that is sufficiently high to turn on the controlled rectifier 18 is a function of the value of the dropping resistor 37 and the effective collector-to-emitter resistance of the transistor 28. The effective collector-to-emitter resistance is varied by varying the transistor base current. This effective resistance may readily be varied sufficiently to vary the capacitor charging time over the entire period of half cycle pulse of proper polarity by varying the transistor base current. As described above the variation in the transistor base current is effected by supplying a voltage from the variable resistor 34, which is a function of the output speed. Thus, it will be seen that this circuit will control the firing of the controlled rectifier 18 throughout applied power pulses of appropriate polarity.

For one such modified control circuit the following additional values of components have been found to enable the circuit of FIGURE 2 to perform satisfactorily:

36—22,000 ohms
37—10,000 ohms
38—General Electric Zener diode 1N1770
41—0.1 microfarad In some applications it may be desirable for the circuit to function as a complete on-off control for each half cycle of proper polarity. With such a control the controlled rectifier will turn on essentially at the beginning of a pulse of proper polarity or it will not turn on at all during that pulse. For instance, large inertial loads driven in a uniform direction tend to maintain the desired speed; however, strong pulses are needed to change the speed when correction is necessary.

Figure 3:
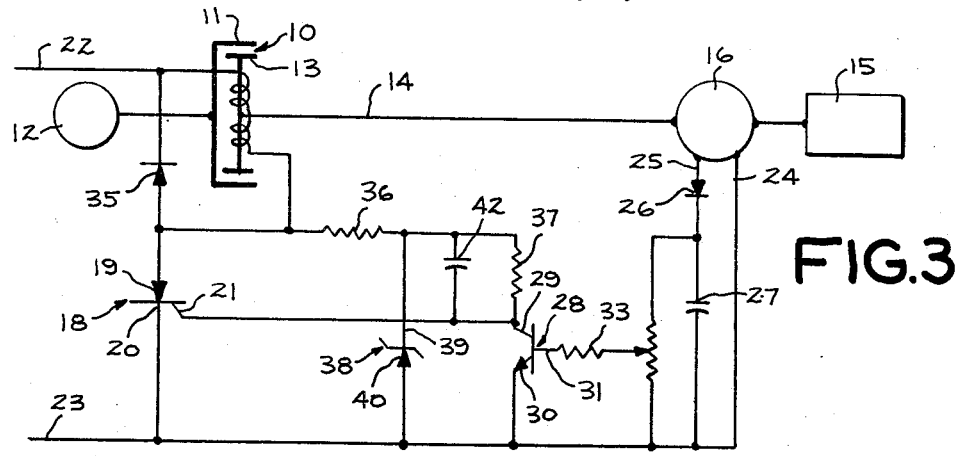
FIGURE 3 is a schematic diagram of still another embodiment of the invention.

My circuit easily may be adapted to perform in such a manner and such a modified circuit is shown in FIGURE 3. This circuit is quite similar to that of FIGURE 2 and the same reference numerals have been used to designate the same components. One change has been made in the circuit, the capacitor 41 of FIGURE 2 has been omitted and a capacitor 42 has been connected on one side to the gate 21 of the controlled rectifier 18 and on its other side to the junction between dropping resistor 36 and dropping resistor 37. With the circuit thus modified, the dropping resistor 36 and the Zener diode 38 provide a voltage plateau, as in the circuit of FIGURE 2. The capacitor 42 offers a low impedance while it is charging and thereafter acts as a high impedance. The capacitor is sized so as to become charged by at least shortly after the Zener plateau voltage is reached. This means that the maximum current to the gate 21 occurs by at least shortly after the Zener plateau voltage is reached, which is very early in each half cycle pulse of proper polarity. Thus the controlled rectifier will be fired early in each pulse of proper polarity or it will not be fired at all in that pulse. The effective collector-to-emitter resistance is, in effect, a current divider with the gate circuit of the controlled rectifier. By varying the effective collector-to-emitter resistance, in the manner explained above, the current to the gate 21 may be controlled to effectively control the firing of the controlled rectifier. I have found a suitable value for capacitor 42 to be .05 microfarad when used with components having the values previously set forth.

The foregoing is a description of illustrative embodiments of the invention and it is my intention in the appended claims to cover all forms which fall within the scope of the invention.

What I claim as new and desire to secure by Letters Patent of the United States is:

1. A control for an electromagnetic clutch having a rotatable output member; said control including:
   (a) a coil for varying the torque capability of said clutch in response to the average current passing through said coil;
   (b) a control circuit for connecting said clutch coil to a source of alternating current;
   (c) a controlled rectifier having an anode, a cathode and a gate, said anode and cathode being connected in said circuit in series with said coil, said gate being connected in said circuit on the anode side of said controlled rectifier through limiting resistance means;
   (d) an unbiased transistor having a base, a collector and an emitter terminal;
   (e) said gate being connected in said circuit on the cathode side of said controlled rectifier through said collector and emitter so that the conductivity between said collector and emitter controls the gate current of said control rectifier;
   (f) generating means for sensing a speed responsive to the speed of said output member of said clutch and producing a D.C. voltage representative thereof;
   (g) means connecting said base to said generating means for supplying a current to said base responsive to the generated voltage to control the conductivity between said collector and emitter whereby the conductivity between said anode and cathode is responsive to the speed of said output member of said clutch.

2. The invention set forth in claim 1 wherein said means connecting said base to said generating means includes a variable resistance for selectively altering the current supplied to said base in response to any predetermined speed of said output member of said clutch.

3. A control for an electromagnetic clutch having a rotatable output member; said control including:
   (a) a coil for varying the torque capability of said clutch in response to the average current passing through said coil;
   (b) a control circuit for connecting said clutch coil to a source of alternating current;
   (c) a controlled rectifier having an anode, a cathode and a gate, said anode and cathode being connected in said circuit in series with said coil, said gate being connected in said circuit on the anode side of said controlled rectifier through a pair of serially connected limiting resistances;
   (d) an unbiased transistor having a base, a collector and an emitter;
   (e) said gate being connected in said circuit on the cathode side of said controlled rectifier through said collector and emitter;
   (f) a Zener diode having an anode and a cathode, said Zener diode being connected in said circuit with its cathode connected between said limiting resistances and its anode connected to the junction of said cathode of said controlled rectifier and said emitter;
   (g) a capacitor is connected in said circuit between said gate and the junction of said cathode of said controlled rectifier and said emitter so that proper conductivity between the collector and emitter will cause the anode to cathode path through said controlled rectifier to become conductive at any predetermined point in pulses of applied electrical energy of proper polarity;
   (h) generating means for sensing a speed responsive to the speed of said output member of said clutch and producing a D.C. voltage representative thereof;
   (i) means connecting said base to said generating means for supplying a current to said base responsive to the generated voltage to control the conductivity between said collector and emitter whereby the conductivity of the anode to cathode path through said controlled rectifier is responsive to the speed of said output member of said clutch.

4. The invention set forth in claim 3 wherein said means connecting said base to said generating means includes a variable resistance for selectively altering the current supplied to said base in response to any predetermined speed of said output member of said clutch.

5. A control for an electromagnetic clutch having a rotatable output member; said control including:
   (a) a coil for varying the torque capability of said clutch in response to the average current passing through said coil;
   (b) a control circuit for connecting said clutch coil to a source of alternating current;
   (c) a controlled rectifier having an anode, a cathode and a gate, said anode and cathode being connected in said circuit on the anode side of said controlled rectifier through a pair of serially connected limiting resistances;
   (d) an unbiased transistor having a base, a collector and an emitter;
   (e) said gate being connected in said circuit on the cathode side of said controlled rectifier through said collector and emitter;
   (f) a Zener diode having an anode and a cathode, said Zener diode being connected in said circuit with its cathode connected between said limiting resistance and its anode connected to the junction of said cathode of said controlled rectifier and said emitter;
   (g) a capacitor connected in said circuit between said gate and the junction between said limiting resistances so that proper conductivity between the collector and emitter will cause the anode to cathode path through said controlled rectifier to become conductive only at the beginning of pulses of applied electrical energy of proper polarity;
   (h) generating means for sensing a speed responsive to the speed of said output members of said clutch and producing a D.C. voltage representative thereof;
   (i) means connecting said base to said generating means for supplying a current to said base responsive to the generated voltage to control the conductivity between said collector and emitter whereby the conductivity of the anode to cathode path through said controlled rectifier is responsive to the speed of said output member of said clutch.

6. The invention set forth in claim 5 wherein said means connecting said base to said generating means includes a variable resistance for selectively altering the current supplied to said base in response to any predetermined speed of said output member of said clutch.

References Cited

UNITED STATES PATENTS

| | | | |
|---|---|---|---|
| Re. 26,119 | 12/1966 | Slater | 307—252 |
| 2,850,654 | 9/1958 | Jaeschke | 310—94 |
| 3,178,628 | 4/1965 | Patten | 318—331 |
| 3,209,228 | 9/1965 | Gawron | 318—341 |
| 3,218,511 | 11/1965 | Rosenbaum | 307—252 |

OTHER REFERENCES

General Electric SCR Manual, second edition, 1961, pp. 39–41, 60, 61, 72–75.

BENJAMIN DOBECK, Primary Examiner

A. G. COLLINS, Assistant Examiner

U.S. Cl. X.R.

318—328